United States Patent
Eggenhuisen et al.

(10) Patent No.: US 11,692,076 B2
(45) Date of Patent: Jul. 4, 2023

(54) INTERFACIAL POLYMERIZATION PROCESS FOR POLYCARBONATE IN INJECTION MOLDING MANUFACTURING WITH USE OF SULFONIC ACID AS A STABILIZER

(71) Applicant: SABIC GLOBAL TECHNOLOGIES B.V., Bergen Op Zoom (NL)

(72) Inventors: Tamara Marijke Eggenhuisen, Bergen op Zoom (NL); Roland Sebastian Assink, Bergen op Zoom (NL); Kazuhiko Mitsui, Moka (JP); Robert Dirk van de Grampel, Bergen op Zoom (NL); Mark van der Mee, Bergen op Zoom (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 563 days.

(21) Appl. No.: 16/609,934

(22) PCT Filed: Jun. 15, 2018

(86) PCT No.: PCT/IB2018/054440
§ 371 (c)(1),
(2) Date: Oct. 31, 2019

(87) PCT Pub. No.: WO2018/229730
PCT Pub. Date: Dec. 20, 2018

(65) Prior Publication Data
US 2020/0115526 A1  Apr. 16, 2020

Related U.S. Application Data

(60) Provisional application No. 62/520,962, filed on Jun. 16, 2017.

(51) Int. Cl.
*C08K 5/42* (2006.01)
*B29C 45/00* (2006.01)
(Continued)

(52) U.S. Cl.
CPC ............ *C08K 5/42* (2013.01); *B29C 45/0001* (2013.01); *C08L 69/00* (2013.01); *B29K 2069/00* (2013.01);
(Continued)

(58) Field of Classification Search
CPC ....... C08K 5/42; B29C 45/0001; B29C 45/72; C08G 64/14; C08L 69/00; C08L 2201/08;
(Continued)

(56) References Cited

U.S. PATENT DOCUMENTS

| | | |
|---|---|---|
| 5,242,973 A | 9/1993 | Komatsu |
| 5,276,109 A | 1/1994 | Sakashita et al. |

(Continued)

FOREIGN PATENT DOCUMENTS

| | | | |
|---|---|---|---|
| CN | 101295161 A | * | 10/2008 |
| DE | 19753542 A1 | | 6/1991 |

(Continued)

OTHER PUBLICATIONS

JP-2004204063-A translation (Year: 2023).*
(Continued)

*Primary Examiner* — Francisco W Tschen
*Assistant Examiner* — Guy F Mongelli
(74) *Attorney, Agent, or Firm* — Cantor Colburn LLP

(57) ABSTRACT

A composition includes a polycarbonate resin formed via an interfacial polymerization process and from 0.05 ppm to 50 ppm of a sulfonic acid. A molded article formed from the composition may exhibit a yellowness index that is less than that of a reference molded article formed from substantially similar polycarbonate composition comprising the polycar-
(Continued)

bonate resin but in the absence of the sulfonic acid. Methods for forming the molded article in accordance with the above are also described.

18 Claims, 3 Drawing Sheets

(51) Int. Cl.
*C08G 64/14* (2006.01)
*C08L 69/00* (2006.01)
*B29K 69/00* (2006.01)

(52) U.S. Cl.
CPC ..... *C08L 2201/08* (2013.01); *C08L 2205/025* (2013.01); *C08L 2205/03* (2013.01)

(58) Field of Classification Search
CPC ........... C08L 2205/025; C08L 2205/03; B29K 2069/00
See application file for complete search history.

(56) References Cited

U.S. PATENT DOCUMENTS

| | | | |
|---|---|---|---|
| 6,727,303 B2 | 4/2004 | Ono et al. | |
| 7,786,246 B2 | 8/2010 | Jansen et al. | |
| 2001/0041759 A1* | 11/2001 | Inoue | C08K 5/42 524/145 |
| 2003/0055200 A1* | 3/2003 | Ando | G02B 1/041 528/196 |
| 2004/0063824 A1* | 4/2004 | Takagi | C08L 71/12 524/115 |
| 2004/0077820 A1* | 4/2004 | Silva | C08G 64/28 528/196 |
| 2004/0132919 A1* | 7/2004 | Kobayashi | C08K 5/0008 525/461 |
| 2007/0191519 A1 | 8/2007 | Jiao et al. | |
| 2008/0011513 A1* | 1/2008 | Kamps | C08L 69/00 174/565 |
| 2009/0088504 A1 | 4/2009 | Chatterjee et al. | |
| 2012/0059098 A1* | 3/2012 | Monden | C08K 5/49 264/331.12 |
| 2013/0225763 A1* | 8/2013 | Pai-Paranjape | C08G 64/24 528/196 |
| 2013/0281586 A1* | 10/2013 | Otonari | C08L 69/00 524/291 |

FOREIGN PATENT DOCUMENTS

| | | | | |
|---|---|---|---|---|
| JP | 04356559 | | 12/1992 | |
| JP | 2002265403 A | * | 9/2002 | ............. C07C 37/20 |
| JP | 2003078130 A | * | 3/2003 | |
| JP | 2003096181 A | * | 4/2003 | ............. C08G 64/06 |
| JP | 2004204063 A | * | 7/2004 | |
| JP | 3667534 B2 | * | 7/2005 | ........... C08G 64/307 |
| JP | 4017951 B2 | * | 12/2007 | |
| JP | 4072670 B2 | * | 4/2008 | ......... C08G 64/1608 |
| JP | 2010254888 A | * | 11/2010 | |
| JP | 4598311 B2 | * | 12/2010 | ........... C08G 64/307 |
| JP | 4951835 B2 | * | 6/2012 | |
| KR | 2002018677 A | * | 3/2002 | ........... C08G 64/307 |
| KR | 2016083582 A | * | 7/2016 | ......... C08G 64/0208 |
| TW | 200400982 A | * | 1/2004 | ............. C08G 64/06 |
| WO | WO-0138436 A1 | * | 5/2001 | ............. C08L 67/02 |
| WO | WO-2004000940 A1 | * | 12/2003 | ........... C08G 64/307 |
| WO | WO-2009133672 A1 | * | 11/2009 | ............. C08G 64/14 |
| WO | WO-2011062104 A1 | * | 5/2011 | ......... C08G 64/0208 |
| WO | 2018229730 A1 | | 12/2018 | |

OTHER PUBLICATIONS

JP-4017951-B2 translation (Year: 2023).*
JP-4951835-B2 translation (Year: 2023).*
JP-2003078130-A translation (Year: 2023).*
Interntional Search Report; International Application No. PCT/IB2018/054440; International Filing Date Jun. 15, 2018; dated Oct. 15, 2018; 6 pages.
Written Opinion, AInternational Application No. PCT/IB2018/054440; International Filing Date Jun. 15, 2018; dated Oct. 15, 2018; 12 pages.

* cited by examiner

US 11,692,076 B2

INTERFACIAL POLYMERIZATION PROCESS FOR POLYCARBONATE IN INJECTION MOLDING MANUFACTURING WITH USE OF SULFONIC ACID AS A STABILIZER

CROSS REFERENCE TO RELATED APPLICATIONS

This application is a 371 of International Application No. PCT/IB2018/054440, filed Jun. 15, 2018, which is incorporated by reference in its entirety, and which claims priority to U.S. Application Ser. No. 62/520,962 filed Jun. 16, 2017.

The present disclosure relates to thermoplastic compositions, and in particular thermoplastic compositions including color stable components that retain desirable physical properties after processing under high heat conditions.

BACKGROUND OF THE DISCLOSURE

Polycarbonates (PC) are used in a wide variety of applications because of their good balance of properties, including moldability, impact and transparency. For some applications, particularly outdoor applications, additives may be introduced to the polycarbonate prevent or slow its degradation. Common additives include ultraviolet (UV) stabilizers to improve weatherability of polycarbonate under exposure to light containing UV radiation, heat stabilizers to improve the ability of the polycarbonate to withstand excessive thermal conditions, and acid stabilizers to reduce decomposition. Some additives are used to protect the polycarbonate during processing.

Typical molding conditions for molded polycarbonate articles such as those used in automotive lighting lenses (e.g., headlamps) and other applications utilize maximum temperatures of from 280-310 degrees Celsius (° C.). Polycarbonate resin, which is a desirable material for such applications because of its high transparency and good impact properties, can be molded into many useful articles at these temperatures. Increasing demands for more highly shaped and lighter weight articles (i.e., articles having a reduced wall thickness), however, result in a need to increase the temperature of the polycarbonate resin during molding so that it has sufficient flow (low enough viscosity) to fill the entire mold and/or to fill a mold cavity having relatively thinner dimensions. In addition, it may be desirable to increase the amount of time that the polycarbonate resin is held at these elevated temperatures to ensure that the polycarbonate is set in the mold. This may be particularly desirable in multicomponent (e.g., 2-component or 2K) molding applications. These applications may thus require increased molding temperatures from standard temperatures of 280° C.-310° C. to 330° C.-360° C., and increased residence times at these temperatures, which are well above the decomposition temperature of polycarbonate. If the polycarbonate or its respective components degrade under these molding conditions, the article can yellow and its mechanical performance, chemical resistance and weatherability could degrade.

These and other shortcomings are addressed by the present disclosure.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document.

SUMMARY

Figure 1:
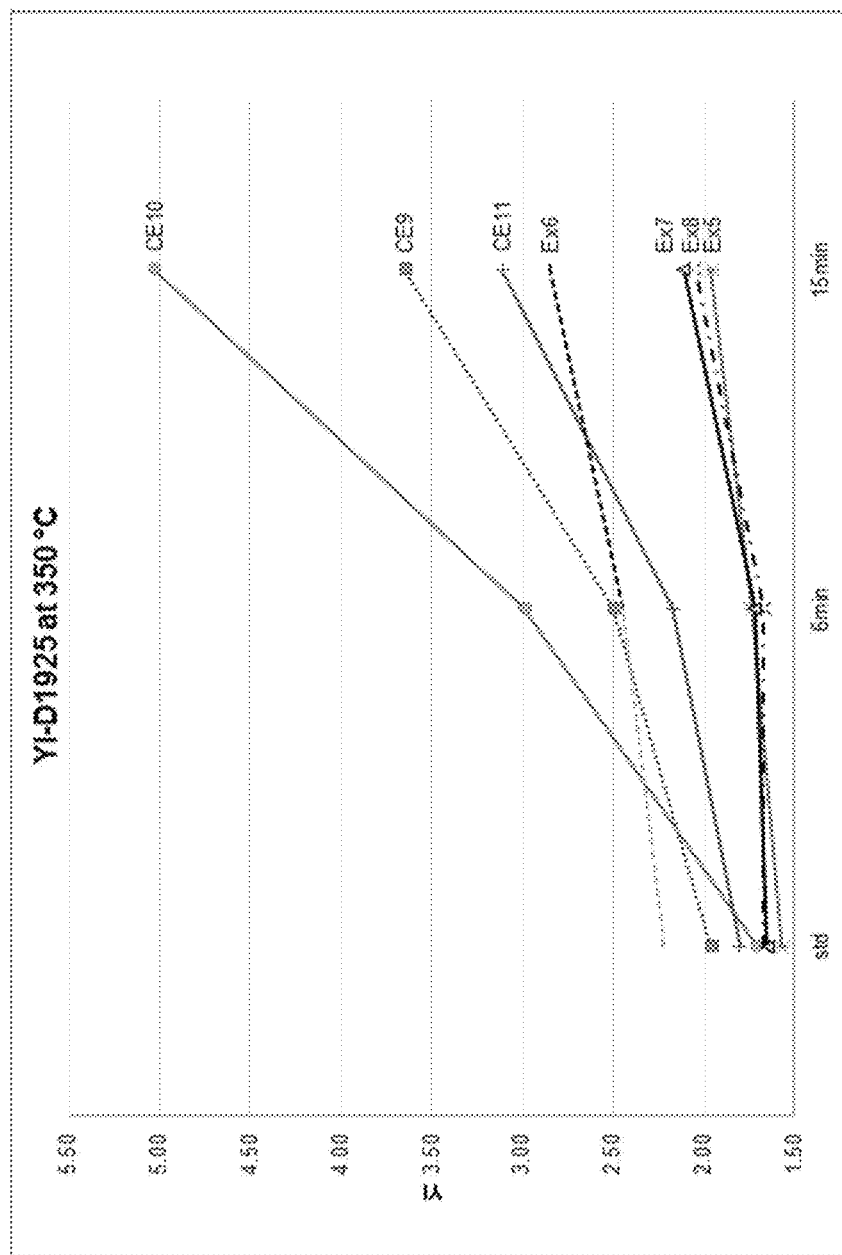
FIG. 1 is a graph showing the change in Yellowness Index for butyl tosylate derivatives after molding conditions of 350° C. for polycarbonate compositions.

Polymer processing methods may require that the melt temperature of the molding apparatus be sufficiently high to achieve desired polymer behavior, such as high flow or thin wall moldability. However, where the melt temperature of the molding apparatus exceeds the decomposition temperature of the polymer, degradation of the polymer may occur. Extended residence times may further degrade the polymer.

Processing temperatures in excess of 300° C., of 350° C., or even 370° C. and prolonged residence times are commonly applied to melt polycarbonate in high flow processes. The higher the temperature and the longer the residence time, the greater the likelihood of degradation, which may impair a number of physical properties. The change in the Yellowness Index (Delta YI, ΔYI) may correspond to degradation. Higher values for the ΔYI over time corresponded to increased weathering.

In some aspects, the present disclosure relates to a composition including a polycarbonate resin and a sulfonic acid. An article formed from the composition, when tested using a 3.2 millimeter (mm) injection molded plaque and tested in accordance with ASTM D1925, exhibits a ΔYI less than that of a reference article injection molded from a substantially similar reference composition consisting essentially of the polycarbonate resin without sulfonic acid or consisting essentially of the polycarbonate resin with a butyl tosylate and without sulfonic acid. An article formed from the composition, when tested using a 3.2 mm injection molded plaque, exhibits a ΔYI less than the ΔYI of a reference article formed from a substantially similar reference composition under a maximum molding temperature of at least 350° C., at least 360° C., or at least 370° C. and at a residence time of at least 15 minutes.

In other aspects, the present disclosure further relates to a composition including a polycarbonate resin, a sulfonic acid, and a heat stabilizer. In other aspects, the present disclosure relates to a composition comprising a polycarbonate resin and a stabilizer, comprising a heat stabilizer, an acid stabilizer, or a combination thereof.

The present disclosure also relates to use of a sulfonic acid in a polycarbonate composition for reducing an increase in Yellowness Index (YI) when tested in accordance with ASTM D1925 when the polycarbonate composition is subjected to molding conditions comprising a maximum molding temperature of at least 330° C. at a residence time of at least 10 minutes, or a maximum molding temperature of at least 340° C. at a residence time of at least 6 minutes, or a maximum molding temperature of at least 350° C. at a residence time of at least 6 minutes, or a maximum molding temperature of at least 360° C. at a residence time of at least 3 minutes.

In other aspects, the present disclosure relates to the use of a sulfonic acid in a polycarbonate composition for reducing a decrease in transmittance of the polycarbonate composition upon injection molding of the polymer composition. The present disclosure also relates to the use of a sulfonic acid as a stabilizer in a polycarbonate composition.

DETAILED DESCRIPTION

The present disclosure can be understood more readily by reference to the following detailed description of the disclosure and the Examples included therein.

Elevated temperatures and increased molding residence times, employed, for example, during two-component (2K) molding, may result in the decomposition of polycarbonate resin and/or other additives. Such decomposition may result in the occurrence of undesirable properties within the molded article, including but not limited to color change (e.g., yellowing), reduction in mechanical properties (e.g., impact strength), loss of chemical resistance, and reduced weatherability. Often, the extent of degradation of the polycarbonate may be measured with respect to the change in the Yellowness Index ($\Delta$YI) observed in the polymer following molding. In various aspects, the present disclosure relates to compositions including a polycarbonate resin and a sulfonic acid. An article formed from the composition, when tested using a 3.2 mm injection molded plaque, exhibits a $\Delta$YI that is less than a $\Delta$YI observed for a reference article injection molded from a substantially similar reference composition consisting essentially of the polycarbonate resin without sulfonic acid. In certain aspects, the composition may further comprise a heat stabilizer.

As used herein, a "substantially similar reference composition" is a reference composition that includes the same components, and the same amounts of the components, as the claimed (or described) inventive composition, except that the reference composition does not include a recited component (e.g., sulfonic acid, a heat stabilizer, and/or a UV absorbing component). In other words, the reference composition is otherwise identical to the claimed/described composition but for the exclusion of the recited component(s). It will be recognized that where the recited component(s) is/are omitted from the reference composition, the omitted component(s) will be replaced with a corresponding content of the primary component of the composition (e.g. polycarbonate). Thus, as shown in the Examples set forth below, if the described composition includes, e.g., 1 part per million by weight (ppm) of sulfonic acid with the balance being polycarbonate and other additional additives, the content of the omitted components may be replaced with a corresponding amount of polycarbonate.

Before the present compounds, compositions, articles, systems, devices, and/or methods are disclosed and described, it should be understood that they are not limited to specific synthetic methods unless otherwise specified, or to particular reagents unless otherwise specified, which can of course vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

Abusively Molded Article

The present disclosure relates in some aspects to a composition including a polycarbonate resin, a heat stabilizer and an acid stabilizer subjected to abusive molding conditions. An article formed from the composition, when tested in accordance with ASTM D1925 and using a 3.2 mm injection molded plaque, exhibits a $\Delta$YI value that is less than the $\Delta$YI of a reference article injection molded from a substantially similar reference composition consisting essentially of the polycarbonate resin without the sulfonic acid.

In one aspect, the molded article, when tested in accordance with ASTM D1925 and using a 3.2 mm plaque, exhibits a $\Delta$YI that is less than 4 with a maximum molding temperature of at least 350° C. and at a residence time of at least 15 minutes. In an aspect, the molded article, when tested using a 3.2 mm plaque, exhibits a $\Delta$YI that is less than 2 with a maximum molding temperature of at least 350° C. and at a residence time of at least 15 minutes. In an aspect, the molded article, when tested using a 3.2 mm plaque, exhibits a $\Delta$YI that is less than 2 with a maximum molding temperature of at least 350° C. and at a residence time of at least 15 minutes. The molded article, when tested in accordance with ASTM D1925 and using a 3.2 mm plaque, exhibits a $\Delta$YI that is between 1.5 and 2 with a maximum molding temperature of at least 350° C. and at a residence time of at least 15 minutes.

It has been found that UV absorbing component retention in an abusively molded article including a polycarbonate resin may be enhanced by including a heat stabilizer component and an acid stabilizer component in the resin. Without being bound to any particular theory, the heat stabilizer component and acid stabilizer component prevent attachment of the UV absorbing component to the polycarbonate chain, which reduces the level of bound UV absorbing component. In other words, the abusively molded article retains a higher level of free UV absorbing component.

Butyl tosylate may be used as an acid stabilizer. Further, contrary to previously known polycarbonate resin-containing molded articles, molded articles according to the present disclosure including the heat stabilizer component and acid stabilizer component may better retain their molecular weight during abusive molding processes. It has been found that the $\Delta$YI when tested in accordance with ASTM D1925 for an abusively molded article including a polycarbonate resin may be further improved by the presence of a sulfonic acid within the polycarbonate resin, rather than using a butyl tosylate as the stabilizer. The presence of a sulfonic acid in the polycarbonate resin may also improve $\Delta$YI where the polycarbonate composition is subjected to abusive molding conditions, e.g., conditions greater than 350° C. and at 370° C.

In some examples, an appropriate heat stabilizer and/or UV absorber may be added to minimize or prevent thermal degradation of the polycarbonate when the resin is subjected to elevated temperatures, particularly those employed during abusive molding. The heat stabilizer and/or a UV absorber may be added in addition to the sulfonic acid, which may be introduced to prevent variation in the rheological properties of the polymer with time and phase separation that may gradually occur as the polymer ages.

Abusive molding conditions may relate to the maximum temperature at which the article is molded and the amount of time the article is held at that maximum temperature. As noted above, while typical molding conditions for molded polycarbonate articles such as those used in automotive lighting (e.g., headlamp) and other applications utilize maximum temperatures of from 280-310° C., in some applications it is desirable to increase the molding temperatures to at least 330° C., up to at least 360° C., or up to at least 370° C. Further, it may be desirable to increase the amount of time that the polycarbonate resin is held at these elevated temperatures; while in standard molding applications residence times may be 6 minutes or less, they may need to be increased to up to 12 minutes or longer in certain applications.

Such abusive molding conditions, however, may result in the degradation of the polycarbonate resin. As an example, a polycarbonate at elevated temperatures degradation of the polycarbonate polymer chain (chain scission) may occur thereby forming free —OH groups in the polymer. In one example, where a benzotriazole UV absorbing component is a further component in the composition, the UV absorbing component may cause the polycarbonate backbone to scission. As the UV absorbing component attaches to the polycarbonate chain, the level of free UV absorbing component is reduced, which may result in the molded article having undesirable properties. The extended residence times further increase the degradative effects.

In certain aspects, abusive molding conditions include molding the article at a maximum temperature of at least 330° C. at a residence time of at least 10 minutes, or at a maximum temperature of at least 330° C. at a residence time of at least 12 minutes, or at a maximum temperature of at least 330° C. at a residence time of at least 15 minutes, or at a maximum temperature of at least 340° C. at a residence time of at least 6 minutes, or at a maximum temperature of at least 340° C. at a residence time of at least 10 minutes, or at a maximum temperature of at least 350° C. at a residence time of at least 6 minutes, or at a maximum temperature of at least 350° C. at a residence time of at least 10 minutes, or at a maximum temperature of at least 350° C. at a residence time of at least 15 minutes, or even at a maximum temperature of at least 360° C. at a residence time of at least 3 minutes. In other words, during the molding, at least the last heating zone of the molding machine is held at a temperature of at least 330° C.

In some embodiments, molding may be performed around 370° C. (e.g., 365° C. to 370° C., or at 370° C.). Molding temperatures around 370° C. may be performed for a portion of the residence time. In further examples, molding temperatures around 370° C. may be performed for 5 minutes, 10 minutes, or 15 minutes, or at any duration within those times.

In another aspect, the abusive molding conditions include molding the article at a maximum temperature of at least 330° C. at a residence time of at least 10 minutes, or a maximum molding temperature of at least 340° C. at a residence time of at least 6 minutes, or a maximum molding temperature of at least 350° C. at a residence time of at least 6 minutes. The abusive molding conditions include molding the article at a maximum temperature of at least 350° C. at a residence time of at least 15 minutes. The abusive molding conditions include molding the article at a maximum temperature of at least 350° C. at a residence time of at least 15 minutes.

As described herein, the abusively molded article may be formed from a composition comprising a polycarbonate resin. A composition comprising one, two, or more different molecular weight (or different high molecular weight) polycarbonates may be used, and may be referred to herein as a "polycarbonate". The polycarbonate resin may have a molecular weight of from 15,000 to 55,000 Daltons, measured according to a polycarbonate standard. The polycarbonate resin may have, e.g., a glass transition temperature (Tg) of between 135° C. and 180° C., measured as per ASTM method D3418.

Suitable polycarbonates for use in molded articles according to the present disclosure include but are not limited to bisphenol A, a polycarbonate copolymer, polyester carbonate polymer, or polycarbonate-polysiloxane copolymer, or combinations thereof. In some embodiments, the polycarbonate resin comprises a polycarbonate homopolymer. In one example, the polycarbonate resin consists essentially of a homopolymer; the resin is free or substantially free of a polycarbonate copolymer. The polycarbonate may comprise at least 10 wt %, at least 20 wt %, at least 30 wt %, at least 40 wt %, at least 50 wt %, at least 60 wt %, at least 70 wt %, at least 80 wt %, or at least 90 wt %, or preferably at least 95 wt %, or at least 99 wt % of a polycarbonate homopolymer.

All types of polycarbonate end groups are contemplated as being useful in the polycarbonate composition. Suitably, however, such end groups do not significantly adversely affect desired properties of the compositions.

In some embodiments, the polycarbonate polymer is a homopolymer. The homopolymer may include repeating units derived from bisphenol A. In another embodiment, polycarbonate component is (or comprises) a copolymer. The copolymer may include repeat units derived from BPA.

In another embodiment, the copolymer includes repeat units derived from sebacic acid. In an even further aspect, the copolymer includes repeat units derived from sebacic acid and BPA.

Suitable polycarbonate copolymers are produced via interfacial processes and commercially available and include, but are not limited to, those marketed under the trade names LEXAN™ EXL, LEXAN™ HFD polymers, LEXAN™ SLX, LEXAN™ FST, LEXAN™ XPC, and LEXAN™ CFR, all commercially available from SABIC™ (formerly GE Plastics), and Covestro APEC™ (former Bayer Material Science). As noted above, although BPA polycarbonates, such as Lexan™ polycarbonates are of particular interest, various polycarbonates may be used in the embodiments disclosed herein, e.g., LEXAN™ XHT (available from SABIC™, a PPPBP/BPA copolycarbonate comprising 33 mol % PPPBP polycarbonat—also called 3,3-bis(4-hydroxyphenyl)-2-phenylisoindolin-1-one).

A polycarbonate can include any polycarbonate material or mixture of such materials, for example, as recited in U.S. Pat. No. 7,786,246, which is hereby incorporated in its entirety for the specific purpose of disclosing various polycarbonate compositions and methods. The term polycarbonate can be further defined as compositions having repeating structural units of the formula (1):

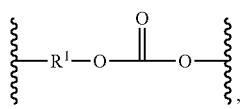 (1)

in which at least 60 percent of the total number of $R^1$ groups are aromatic organic radicals and the balance thereof are aliphatic, alicyclic, or aromatic radicals. In a further aspect, each $R^1$ is an aromatic organic radical and, more preferably, a radical of the formula (2):

wherein each of $A^1$ and $A^2$ is a monocyclic divalent aryl radical and $Y^1$ is a bridging radical having one or two atoms that separate $A^1$ from $A^2$. In various aspects, one atom separates $A^1$ from $A^2$. For example, radicals of this type include, but are not limited to, radicals such as —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ is preferably a hydrocarbon group or a saturated hydrocarbon group such as methylene, cyclohexylidene, or isopropylidene. The polycarbonate resin, whether a homopolymer or a copolymer, may be free or substantially free of nitrogen.

In addition to the polycarbonates described above, combinations of the polycarbonate with other thermoplastic polymers, for example combinations of homopolycarbonates and/or polycarbonate copolymers may be suitable. However, in specific aspects of the present disclosure, the polycarbonate resin comprises a polycarbonate homopolymer. In one example, the polycarbonate resin consists essentially of a homopolymer. For example, the polycarbonate resin may be free or substantially free of polycarbonate copolymer.

In some aspects of the disclosure, the polycarbonate resin has an endcap level of at least 95%. Polycarbonate resins having this endcap level may generally be produced by an interfacial polymerization process. Purely by way of example, in one particular interfacial polymerization process in which the polycarbonate is BPA polycarbonate, the BPA polycarbonate may be produced by amine catalyzed interfacial polycondensation of bisphenol A and phosgene. In various examples, the polycarbonate resin may be endcapped with a carbonate group derived from para-cumyl phenol, para-t-butyl phenol, phenol, cyanophenol, (e.g., p-cyanophenol), benzophenone (e.g., 4,4'-dihydroxybenzophenone), 1,1,1-tris(4-hydroxyyphenyl)ethane (THPE), or a combination comprising at least one of the foregoing. The polycarbonate resin may have a mole ratio of carbonate groups of greater than 80%.

In contrast to other known methods for forming polycarbonates (such as melt transesterification processes) in which the polycarbonate has an endcap level of less than 95%, polycarbonates formed by an interfacial polymerization process are characterized as having an endcap level of at least 95%. The polycarbonate resin may have an endcap level of at least 98%, or even an endcap level of at least 99%. In further aspects, the polycarbonate resin is substantially fully endcapped.

Thus, in various aspects of the present disclosure, the polycarbonate resin may be formed via an interfacial polymerization process. In some examples, the polycarbonate resin is free or substantially free of polycarbonate resin formed via a melt polycarbonate process. An interfacial process may include, e.g., the reaction of at least one dihydroxy compound, generally a dihydroxyaromatic compound, with phosgene in a solvent, in the presence of a basic reagent as acid acceptor and an amine as catalyst.

Melt transesterification processes are well known in the art for producing polycarbonate by reacting a diaryl carbonate and a dihydroxy compound in the optional presence of transesterification catalysts. Other potentially useful methods tend to be direct variations on, or simple combinations of, these two primary processes.

Polycarbonates, including isosorbide-based polyester-polycarbonate, can include copolymers including carbonate units and other types of polymer units, including ester units, and combinations including at least one of homopolycarbonates and copolycarbonates. An exemplary polycarbonate copolymer of this type is a polyester carbonate, also known as a polyester-polycarbonate or polyester carbonate. Such copolymers further contain carbonate units derived from oligomeric ester-containing dihydroxy compounds (also referred to herein as hydroxy end-capped oligomeric acrylate esters).

In various further aspects, "polycarbonates" and "polycarbonate resins" as used herein further include homopolycarbonates, copolymers including different $R^1$ moieties in the carbonate (referred to herein as "copolycarbonates"), copolymers including carbonate units and other types of polymer units, such as ester units, polysiloxane units, and combinations including at least one of homopolycarbonates and copolycarbonates. As used herein, "combination" is inclusive of blends, mixtures, alloys, reaction products, and the like.

In a further aspect, the polycarbonate resin includes a polyester-polycarbonate copolymer, and specifically a polyester-polycarbonate copolymer including ester units that include soft block ester units, also referred to herein as aliphatic dicarboxylic acid ester units. Such a polyester-polycarbonate copolymer including soft block ester units is also referred to herein as a poly(aliphatic ester)-polycarbonate. The soft block ester unit can be a $C_{6-20}$ aliphatic dicarboxylic acid ester unit (where $C_{6-20}$ includes the terminal carboxyl groups), and can be straight chain (i.e., unbranched) or branched chain dicarboxylic acids, cycloalkyl or cycloalkylidene-containing dicarboxylic acids units, or combinations of these structural units. In a still further aspect, the $C_{6-20}$ aliphatic dicarboxylic acid ester unit includes a straight chain alkylene group including methylene (—$CH_2$—) repeating units.

In some aspects of the disclosure, the polycarbonate resin may have a particular purity level. For example, the polycarbonate resin may be a high purity polycarbonate resin. High purity polycarbonate resins are generally characterized as having a purity of at least 99.7% and which contains less than 2 parts per million (ppm) sulfur, although other purity criteria could be applied. The polycarbonate resin included in molded articles of the disclosure may be produced from a bisphenol A polymer having a purity of at least 99.7% and which contains less than 2 ppm sulfur. Purity may be measured by high performance liquid chromatography, for example. Sulfur levels may be measured, for example, by a Total Sulfur Analysis based on combustion and coulometric detection.

In further examples, the polycarbonate resin comprises less than 50 ppm each of sodium, potassium calcium, or magnesium. The polycarbonate resin may comprise less than 10 ppm of carbamate endgroups. The polycarbonate resin may comprise less than 100 ppm of bromine and/or chlorine. The polycarbonate resin may have a phenolic endgroup concentration of less than 150 ppm or fewer. The polycarbonate resin may include less than 25 ppm of hydroxyl phenolic end groups. Further, the polycarbonate resin may include less than 20 ppm of hydroxyl phenolic end groups. The polycarbonate resin may include less than 100 ppm of benzylic protons.

A composition comprising the polycarbonate resin and sulfonic acid may comprise less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography. The composition may comprise phenolic endgroups at less than 2 ppm. The composition may comprise halogen at less than 2 ppm.

The present disclosure also provides polycarbonate compositions including a polycarbonate resin and a sulfonic acid. The sulfonic acid may comprise an organosulfonic acid stabilizer of the formula:

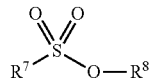

wherein each $R^7$ is independently a $C_{1-30}$ alkyl, $C_{6-30}$ aryl, C7-30 alkylarylene, $C_{7-30}$ arylalkylene, or a polymer unit derived from a $C_{2-32}$ ethylenically unsaturated aromatic sulfonic acid or its ester, and $R^8$ is hydrogen. The sulfonic acid may comprise an alkylbenzene sulfonic acid, a polystyrene sulfonic acid, or a p-toluene sulfonic acid anhydride. In a specific example, the sulfonic acid may comprise p-toluene sulfonic acid. The sulfonic acid may be present in an amount of, e.g., 0.5 ppm to 50 ppm, preferably 0.5 ppm to 25 ppm, or 0.5 ppm to 15 ppm, or 0.5 ppm to 5 ppm. The sulfonic acid may be present in an amount of 1.0 ppm to 50 ppm, preferably 2.0 ppm to 25 ppm, or 3.0 ppm to 15 ppm.

Without being bound to any particular theory, the sulfonic acid contributes to stabilizing a UV absorbing component in the molded article, preventing or minimizing binding of the UV absorbing component to the polycarbonate chain when subjected to abusive molding.

In some aspects, the polycarbonate composition may comprise a heat stabilizer and an acid stabilizer. The heat stabilizer may stabilize the polycarbonate resin in the molded article formed from the composition by improving color stability upon heat processing. In some aspects the heat stabilizer includes, e.g., at least one organophosphorous compound, including but not limited to a phosphite, phosphine or phosphonite compound. In particular aspects, the heat stabilizer includes tris-(2,4-di-tert-butylphenyl) phosphite (e.g., IRGAFOS® 168, available from BASF) (IRG), triphenylphosphine (TPP), tridecylphosphite (TDP), tetrakis (2,4-di-tert-butylphenyl)-4,4-diphenyldiphosphonite) (PEPQ), bis (2,4-dicumylphenyl) pentaerythritol diphosphite (e.g., Doverphos S-9228, available from Dover Chemical) (DP), diphenyl monodecyl phosphite (DPDP), or combinations thereof. In specific aspects, the heat stabilizer includes IRG.

In some aspects, the heat stabilizer is present in the composition in an amount of from 0.01 wt % to 0.1 wt % of the composition, or in certain aspects in an amount of from 0.01 wt % to 0.5 wt % of the composition, or an amount of from 0.01 wt % to 0.1 wt % of the composition.

The heat stabilizer component may stabilize the polycarbonate resin in the molded article by improving color stability upon heat processing. In some aspects the heat stabilizer component includes at least one organophosphorous compound, including but not limited to a phosphite, phosphine or phosphonite compound.

Molded articles according to aspects described herein may include at least 60% unbound UV absorbing component when molded under abusive molding conditions. In more specific aspects, the molded article includes at least 70% unbound UV absorbing component when molded under abusive molding conditions, or includes at least 80% unbound UV absorbing component when molded under abusive molding conditions, or even includes at least 90% unbound UV absorbing component when molded under abusive molding conditions.

In addition to the foregoing components, the disclosed molded articles can optionally include an effective amount of one or more additional additive materials ordinarily incorporated in polycarbonate resin compositions of this type, with the proviso that the additives are selected so as to not significantly adversely affect the desired properties of the polycarbonate resin composition.

Combinations of additives can be used. Such additives can be combined with other components at a suitable time during the mixing of the components prior to or during molding. Exemplary and non-limiting examples of additive materials that can be present in the disclosed molded article include additional reinforcing fillers, an acid scavenger, anti-drip agent, antioxidant, antistatic agent, chain extender, colorant (e.g., pigments and/or dyes), de-molding agent, flow promoter, lubricant, mold release agent, plasticizer, quenching agent, flame retardant stabilizer (including for example a thermal stabilizer, a hydrolytic stabilizer, or a light stabilizer), UV reflecting additive, or any combination thereof.

The molded article may include additional additive materials, e.g., a phenolic heat stabilizer component (e.g., Irganox™ 1076, available from BASF), a carboxylic acid ester (e.g., PETS), or a combination thereof.

The disclosed compositions may further include a UV absorbing component. By absorbing UV radiation and dissipating the energy via unreactive pathways, a UV absorbing component may be used to minimize yellowing and stabilize the polycarbonate. Often, colorants that absorb in the 500 to 700 nanometer (nm) wavelength region may be added to compensate for the yellow appearance that is generated by addition of UV absorbing component.

In certain aspects, the UV absorbing component is a benzotriazole compound, a triazine compound, a cyanoacrylate, a benzoxinane, or a combination thereof. Examples of UV absorbing components include, but are not limited to: 2-(2'-Hydroxy-5'-t-octylphenyl) benzotriazole (e.g., CYASORB™ UV5411, available from Cytec Industries) (UV5411), 2-(2 hydroxy-3,5 dicumyl) benzotriazole (e.g., Tinuvin™ 234, available from BASF) (UVA 234), phenol, 2,2'-methylenebis(6-(2H-benzotriazol-2-yl)-4-(1,1,3,3-tetramethylbutyl)- (e.g., Tinuvin™ 360, available from BASF) (LA31RG/T360), phenol, 2-(4,6-diphenyl-1,3,5-triazin-2-yl)-5-(hexyloxy)- (e.g., Tinuvin™ 1577, available from BASF) (T1577), 1,3-Bis((2-cyano-3,3-diphenylacryloyl)oxy)-2,2-bis(((2-cyano-3,3-diphenylacryloyl)oxy) methyl)propane (e.g., Uvinul™ 3030, available from BASF) (UV3030), 2,2'-(1,4-phenylene)bis-4h-3,1-benzoxazin-4-one (e.g., CYASORB™ UV-3638, available from Cytec Industries) (UV-3638), and combinations thereof. In one particular aspect, the UV absorbing component is 2-(2'-Hydroxy-5'-t-octylphenyl) benzotriazole (CYASORB™ UV5411).

Any effective amount of UV absorbing component can be included in the molded article. In some aspects, the UV absorbing component is present in the molded article in an amount of from 0.01 to 10.0 wt % of the composition, or in certain aspects in an amount of from 0.01 to 0.50 wt % of the composition, or even in an amount of from 0.05 to 0.30 wt % of the composition.

According to aspects of the present disclosure, the molded article formed from the described compositions may be of a particular dimension in order to the improved ΔYI disclosed herein. As an example, the molded article may be of a particular thickness. In one example, the molded article may have a maximum thickness of 3 mm, or in certain aspects has a thickness of from 1 mm to 5 mm or 1.5 to 2.0 mm or, a thickness of from 0.3 mm to 5 mm. In further examples, the molded article may have a maximum length or width dimension of from 30 centimeters (cm) to 100 cm.

In further aspects, in addition to the polycarbonate resin and sulfonic acid (and the heat stabilizer) the composition may include a colorant as noted above. The colorant may be added to impart a particular color to the resultant molded article. The colorant can be any suitable colorant, including a pigment, a dye, and/or a combination thereof. The colorant can be an organic colorant, an inorganic colorant, and/or combinations thereof. The colorant can include titanium dioxide, carbon black, and/or combinations thereof. In some aspects, molded articles formed from the compositions of the present disclosure may have one or more particular colorimetric values. Colorimetric values (dE*, L*, a*, b*) may be calculated according to ASTM E308-15 (Standard Practice for Computing the Colors of Objects by Using the CIE System) using spectral transmission data for D65 illumination and 10° observer. Transmission spectra may be collected on an X rite i7 spectrophotometer. Color difference may be calculated according to the CIE 1976 color difference equation:

$$dE^* = \sqrt{dL^{*2} + da^{*2} + db^{*2}}$$

Exemplary colorants may include those that are appropriate for use with an acid quencher and polycarbonate. These colorants may include Solvent Green 3, Solvent Green 28, Solvent Green 38, Pigment Green 50, Pigment Green 36, Solvent Red 52, Solvent Red 101, Solvent Red 111, Solvent Red 135, Solvent Red 169, Solvent Red 179, Solvent Red 207, Pigment Red 101, Disperse Red 22, Vat Red 41, Solvent Orange 60, Solvent Orange 63, Disperse Orange 47, Solvent Violet 13, Solvent Violet 14, Solvent Violet 36, Solvent Violet 50, Disperse violet 26/31, Pigment Blue 29, Pigment Blue 60, Copper Phthalocyanine Pigment Blue 15.4, Disperse Blue 73, Solvent Blue 97, Solvent Blue 101, Solvent Blue 104, Solvent Blue 122, Solvent Blue 138, Pigment Yellow 53, Pigment Yellow 138, Pigment Yellow 139, Disperse Yellow 201, Solvent Yellow 33, Solvent Yellow 114, Solvent Yellow 93, Solvent Yellow 98, Solvent Yellow 163, Solvent Yellow 160:1, Solvent Yellow 188, Pigment Brown 24, Amino Ketone Black, chrome oxides, carbon black, channel black, pigment black 6, and mixtures thereof.

In some aspects, the colorant is present in the molded article in an amount of from 0.00001 to 0.01 wt % of the composition, or in certain aspects in an amount of from 0.00002 to 0.0010 wt % of the composition, or even in an amount of from 0.00002 to 0.0005 wt % of the composition. In further aspects, exemplary colorants of the present disclosure may exhibit no appreciable change in the observed transmission spectra of the polycarbonate resin composition after being subjected to abusive molding conditions. Transmission spectra may be measured on, e.g., an X-Rite i7 spectrophotometer for standard and abusive molding conditions using a color plaque, such as a 2.5 mm or 3.0 mm color plaque.

In addition to the foregoing components, the disclosed compositions can optionally include an effective amount of one or more additional additive materials ordinarily incorporated in polycarbonate resin compositions of this type, with the proviso that the additives are selected so as to not significantly adversely affect the desired properties of the polycarbonate resin composition. Combinations of additives may be used. Such additives may be combined with the other components at a suitable time during the mixing of the components prior to or during molding. Exemplary and non-limiting examples of additive materials that can be present in the disclosed molded article include additional reinforcing fillers, acid scavengers, anti-drip agents, antioxidants, antistatic agents, chain extenders, colorants (e.g., pigment and/or dye), de-molding agents, flow promoters, lubricants, mold release agents, plasticizers, quenching agents, flame retardants, UV reflecting additives, or any combination thereof. In particular aspects, the composition includes an antioxidant (e.g., Irganox™ 1076, available from BASF), a carboxylic acid ester (e.g., PETS), or a combination thereof.

Flame retardants include, for example, salts of $C_{2-16}$ alkyl sulfonates such as potassium perfluorobutane sulfonate (Rimar salt), potassium perfluoroctane sulfonate, and tetraethylammonium perfluorohexane sulfonate, salts of aromatic sulfonates such as sodium benzene sulfonate, sodium toluene sulfonate (NATS), and the like, salts of aromatic sulfone sulfonates such as potassium diphenylsulfone sulfonate (KSS), and the like; salts formed by reacting for example an alkali metal or alkaline earth metal (e.g., lithium, sodium, potassium, magnesium, calcium and barium salts) and an inorganic acid complex salt, for example, an oxo-anion (e.g., alkali metal and alkaline-earth metal salts of carbonic acid, such as $Na_2CO_3$, $K_2CO_3$, $MgCO_3$, $CaCO_3$, and $BaCO_3$, or a fluoro-anion complex such as $Li_3AlF_6$, $BaSiF_6$, $KBF_4$, $K_3AlF_6$, $KAlF_4$, $K_2SiF_6$, or $Na_3AlF_6$ or the like. Rimar salt and KSS and NATS, alone or in combination with other flame retardants, are particularly useful. Other flame retardants include aromatic phosphates include triphenyl phosphate, tricresyl phosphate, isopropylated triphenyl phosphate, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2, 5,5'-trimethylhexyl) phosphate, and 2-ethylhexyl diphenyl phosphate. Di- or polyfunctional aromatic phosphorus-containing compounds are also useful, for example resorcinol tetraphenyl diphosphate (RDP), the bis(diphenyl) phosphate of hydroquinone and the bis(diphenyl) phosphate of bisphenol A (BPADP), respectively, and their oligomeric and polymeric counterparts. Flame retardant compounds containing phosphorus-nitrogen bonds include phosphonitrilic chloride, phosphorus ester amides, phosphoric acid amides, phosphonic acid amides, phosphinic acid amides, SolDP, phosphazene, and tris(aziridinyl) phosphine oxide. When used, phosphorus-containing flame retardants are present in amounts of 0.1 to 30 parts by weight, more specifically 1 to 20 parts by weight, based on 100 parts by weight of the total composition, excluding any filler.

A composition may include a release agent to facilitate removal of the composition from molded parts in processing. Suitable mold release agents include, for example, metal stearate, stearyl stearate, pentaerythritol tetrastearate, beeswax, montan wax, paraffin wax, or the like, or combinations including at least one of the foregoing mold release agents. Mold releasing agents are generally used in amounts of 0.1 wt % to 1.0 wt % of the resin composite, but could be used in other amounts. Particular mold release agents may include carboxylic aliphatic acid esters including glycerol tristearate (GTS), glycerol monostearate (GMS), pentaerythritol tetrastearate (PETS), as well as saturated carbohydrate combinations (including poly-alphaolefins).

In some embodiments, one or more of the additives in the molded article, including but not limited to the heat stabilizer and the acid stabilizer, have maximum impurities of no more than 20 ppm sodium, no more than 10 ppm magnesium, no more than 20 ppm calcium, no more than 0.5 ppm zinc and no more than 0.5 ppm tin. In some aspects each of the additives include no more than 10 ppm sodium, or no more than 2 ppm sodium, or no more than 2 ppm magnesium, or no more than 10 ppm calcium.

In a further aspect the present disclosure, a molded article derived from the composition disclosed herein may be transparent. As used herein, transparent, transparency, and their derivatives may refer to a level of transmission for a resin composition that is greater than 89%, including exemplary transmission values of at least 90%, at least 91%, at least 92%, at least 93%, at least 94%, at least 95%, or any range of transmission values derived from the above exemplified values. In a particular aspect, the molded article has a transmission of from 89% to 93%. The transmission may be calculated according to ASTM method D1003-13 (Standard Test Method for Haze and Luminous Transmittance of Transparent Plastics), Procedure A, from data collected on, e.g. a Haze-Guard dual (BYK Gardner) using a standard lamp D65.

Methods for Forming Abusively Molded Article

The present disclosure also provides methods for forming polycarbonate-derived molded articles. In one aspect, a method for forming a molded article includes: combining a polycarbonate resin and a sulfonic acid. In some aspects, further components may comprise a heat stabilizer and a UV absorber among other additives such as colorants. The foregoing mixture may be used to form the article by molding the mixture under abusive molding conditions. The molded article, when tested in accordance with D1925 on a 3.2 mm injection molded plaque, exhibits a ΔYI less than that of a substantially similar reference composition consisting essentially of a polycarbonate resin or consisting essentially of a polycarbonate resin and a butyl tosylate as an acid stabilizer. In certain examples, the disclosed molded plaque when tested in accordance with D1925 on a 3.2 mm injection molded plaque may exhibit a ΔYI that is 10% less than, 20% less than, 30% less than, 40% less than, 50% less than, 60% less than, or 70% less than that of a substantially similar reference composition consisting essentially of a polycarbonate resin or consisting essentially of a polycarbonate resin and a butyl tosylate as an acid stabilizer.

In further aspects, the molded article when tested in accordance with D1925 on a 3.2 mm injection molded plaque, exhibits a ΔYI less than 4 after a maximum molding temperature of at least 350° C. and at a residence time of at least 15 minutes. In yet further aspects, the molded article when tested in accordance with D1925 on a 3.2 mm injection molded plaque, exhibits a ΔYI less than 4 after a maximum molding temperature of at least 370° C. and at a residence time of at least 15 minutes. In still further aspects, the molded article when tested in accordance with D1925 on a 3.2 mm injection molded plaque, exhibits a ΔYI less than 2 after a maximum molding temperature of at least 350° C. and at a residence time of at least 15 minutes.

Further aspects of the present disclosure provide methods for forming a molded article that includes: combining a polycarbonate resin, a heat stabilizer and an acid stabilizer to form a mixture; and forming a molded article from the mixture by molding the mixture under abusive molding conditions. A molded article, when tested using a 2.5 mm injection molded color plaque, may have a level of free —OH groups that is less 200 ppm by weight.

Further aspects of the present disclosure relate to methods for forming a molded article that includes combining a polycarbonate resin and sulfonic acid (and heat stabilizer, UV absorber, and a colorant) to form a mixture, and forming a molded article from the mixture by molding the mixture under abusive molding conditions. The molded article, when tested in accordance with ASTM D1925 and using a 3 mm color plaque, may exhibit a ΔYI of less than 4 following molding under abusive molding conditions as compared to a reference article molded under standard processing conditions (e.g., 100 to 120° C. above the Tg of the polymer, with as short a residence time a possible). Depending upon the composition, the standard processing conditions can be a maximum molding temperature of 300° C., of 350° C., or of 370° C. at a residence time of 6 or 15 minutes).

In one example, forming the article may comprise combining (a) a polycarbonate resin formed from an interfacial polymerization process and (b) a sulfonic acid, so as to form a polycarbonate composition; and molding the polycarbonate composition to form the article. The molding may occur at the abusive temperatures described herein.

Other aspects of the method include selection of a polycarbonate resin, heat stabilizer, acid stabilizer, and optional additional additive components such as those described above. Molded articles formed according to the above methods may have one or more of the physical characteristics described above, including but not limited to those relating to transparency, colorimetric values (e.g., dE* and db*), transmission spectra, difference in absorbance intensity, shift in maximum absorbance, maximum absorbance, and yellowing index.

Molded articles according to aspects of the disclosure described herein may be applicable for use in a wide variety of applications, and in particular articles requiring color stability combined with abusive molding conditions. The ability to use abusive molding conditions allows filling of thinner wall molds, molds with more complex designs and larger parts, while retaining the molecular weight of the polymer and thus retaining the impact properties. Attaining the higher flow by reducing the molecular weight of the polymer can adversely affect properties of the polymer such as impact properties. Further, the molded articles may be formed by a variety of forming methods, including but not limited to injection molding, sheet extrusion, and glazing applications.

For example, an injection molded article may exhibit a yellowness index that is less than that of a reference molded plaque injection molded from a substantially similar reference composition consisting essentially of the polycarbonate resin and in the absence of the sulfonic acid. The injection molding may comprise a flow length in the range of from 100 mm to 300 mm.

In some examples, the injection molding may comprise a flow length of greater than 100 mm. In some examples, the injection molding may comprise a flow length of greater than 150 mm. The injection molding may be performed at a temperature of 370° C. The molded articles may have a thickness of from 1 mm to 5 mm.

The molded articles disclosed herein may be particularly useful in a variety of applications where transparency, retention of mechanical properties, and thin-wall moldability are desired. For example, the disclosed molded articles may be used in electronic, automotive, imaging, or optical applications. Such applications may include, but are not limited to: covers (such as transparent lens and/or transparent cover), windows, lighting, and glazing. The covers, such as lenses, can include, for example, automotive lighting lens (e.g., headlamp, particularly high flow automotive lens) lamp cover (e.g., head lamp cover), a lamp lens (e.g., head lamp lens, an inner lens, a fog lamp lens, a rear lamp lens, a rear lamp inner lens, an interior lamp lens), optical lenses (including camera and viewing lenses (e.g., for mobile telephone cameras and for digital still photography cameras), mirrors, telescopic lenses, binoculars, automotive camera lenses) and ophthalmic items (such as eyewear including sunglasses, protective goggles, face shields, and prescription lenses). Windows can include anti-fog windows; in Lighting can include light guide, street lighting, outdoor lighting, and high efficiency lighting (such as light emitting diode LED applications, organic LED applications, fluorescent lighting applications, vapor gas discharge lighting applications, and neon light applications, which may produce less heat as a byproduct compared to conventional light sources).

In a still further aspect, non-limiting examples of such devices in the automotive field which may use the disclosed blended thermoplastic compositions in the vehicle's interior include adaptive cruise control, headlight sensors, windshield wiper sensors, and door/window switches.

In additional embodiments, the molded article may be a lens, a vehicle light, a waveguide element, a reflector, a collimator, a housing for a light source, a lamp bezel, a lamp holder, a lamp cover, a display screen, glazing, a safety goggle, a visor, a medical device, a face shield, an optical fiber, a fuse, a component of a domestic appliance, a machine housing, a fire shield, a food tray, a packaging film, an animal cage, a tray, an optical film, a light bulb, or a film laminate.

Various combinations of elements of this disclosure are encompassed by this disclosure, e.g. combinations of elements from dependent claims that depend upon the same independent claim.

Properties and Articles

Molded articles formed under abusive molding conditions according to aspects described herein may exhibit several improved properties over previously known molded articles. Properties of such molded articles include, but are not limited to, reduced degradation following abusive molding characterized by improved yellowing index ($\Delta YI$) following abusive molding, and improved $\Delta YI$ following weathering. Higher values for the change in the Yellowness Index (Delta YI) over time corresponded to increased weathering. YI is derived from spectrophotometric data to describe the shift in color among a series of test specimens. The yellowness index may be observed according to ASTM D1925 using a colorimeter. YI may be obtained from spectrophotometric data to describe the change in color among a series of test specimens.

In certain examples, the disclosed molded plaque when tested in accordance with D1925 on a 3.2 mm injection molded plaque may exhibit a $\Delta YI$ that is 10% less than, 20% less than, 30% less than, 40% less than, 50% less than, 60% less than, or 70% less than that of a substantially similar reference composition consisting essentially of a polycarbonate resin or consisting essentially of a polycarbonate resin and a butyl tosylate as an acid stabilizer. In further examples, the molded article when tested in accordance with ASTM D1925 (1988), has a $\Delta YI$ of less than 4 after abusive molding, or a $\Delta YI$ of less than 3 after abusive molding, or a $\Delta YI$ of less than 2 after abusive molding. The $\Delta YI$ is compared to a molded article having the same components, and the same amounts of components, that has not been subjected to abusive molding conditions. In further aspects the molded article, when tested in accordance with ASTM D1925 (1988) and using a 3.2 mm molded plaque, has a $\Delta YI$ of less than 5.0, or a $\Delta YI$ of less than 4.0, or a $\Delta YI$ of less than 3.0, or a $\Delta YI$ of less than 2.0, or a $\Delta YI$ of from 1.5 to 2. The $\Delta YI$ is compared to a molded article having the same components and the same amounts of components, but has not been weathered. As an example, the molded article may exhibit a $\Delta YI$ of less than 4.0 after abusive molding at a maximum molding temperature of at least 350° C., 360° C., or 370° C. for a time of 15 minutes as compared to an article molded at a temperature of 300° C.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

The components and additives presented in Table 1 were used to prepare compositions according to aspects of the present disclosure and examples to be used for comparison to molded articles according to aspects of the disclosure.

TABLE 1

| Component/ Additive | Chemical description | Source or CAS No. |
| --- | --- | --- |
| PC1 | Linear Bisphenol A polycarbonate, produced via interfacial polymerization from BPA having a purity of 99.4-99.5% wt % determined by HPLC, Mw = 30-31 kiloDaltons (kDa) as determined by GPC using BPA polycarbonate standards, phenol end-capped | SABIC |

TABLE 1-continued

| Component/Additive | Chemical description | Source or CAS No. |
|---|---|---|
| PC2 | Linear Bisphenol A polycarbonate, produced via interfacial polymerization from BPA having a purity of 99.4-99.5% wt % determined by HPLC, Mw = 22-23 kDa as determined by GPC using BPA polycarbonate standards, PCP end-capped | SABIC |
| PC3 | Linear Bisphenol A polycarbonate, produced via interfacial polymerization from BPA having a purity of 99.7 wt % determined by HPLC, Mw = 30-31 kDa as determined by GPC using BPA polycarbonate standards, phenol end-capped | SABIC |
| PC4 | Linear Bisphenol A polycarbonate, produced via interfacial polymerization from BPA having a purity of 99.7 wt % determined by HPLC, Mw = 22-23 kDa as determined by GPC using BPA polycarbonate standards, PCP end-capped | SABIC |
| PC5 | PPP-BP (N-phenylphenolphthaleinyl bisphenol, 2,2-bis(4-hydro)—bisphenol A polycarbonate copolymer, 33 mol % PPP-BP, Mw = 21-25 kDa as determined by GPC using bisphenol A polycarbonate standards, para-cumylphenol (PCP) end-capped, with BPA carbonate units derived from BPA having 99.4-99.5% purity | SABIC |
| AO1 | Tris-(2,4-di-tert-butylphenyl) phosphite IRGAFOS 168 (Irgafos ™ 168) | Ciba |
| AO2 | Octadecyl3(3,5-di-tertbutyl-4-hydroxyphenyl)propionate Irganox 1076 (Irg 1076) | BASF |
| PETS | Palmitic/Stearic Acid Ester of Dipenta/Pentaerythritol | 115-83-3 |
| UV5411 | 2-(2'-Hydroxy-5'-t-octylphenyl) benzotriazole | 3147-75-9 |
| BuTos premix-3 | Masterbatch of 0.4 wt % of butyl tosylate in PC1 | TCI |
| p-TSA premix | Masterbatch of 0.33 wt % of p-toluene sulfonic acid monohydrate in PC1 | Aldrich |
| Poly p-TSA premix | Masterbatch of 0.34 wt % of polystyrene sulfonic acid in PC1 | Aldrich |
| p-TSAA premix | Masterbatch of 0.28 wt % of p-toluene sulfonic anhydride in PC1 | Aldrich |
| 4-DBSA premix | Masterbatch of 0.57 wt % of 4-dodecylbenzene sulfonic acid in PC1 | Aldrich |
| p-TSA Na premix | Masterbatch of 0.34 wt % of sodium p-toluene sulfonate in PC1 | Aldrich |
| 10-CSA premix | Masterbatch of 0.41 wt % of 10-camphor sulfonic acid in PC1 | Aldrich |

Formulations formed from the components in Table 1 were abusively molded and tested for ΔYI. Comparative example 1 (CE1) included polycarbonate resins with no acid stabilizer. Example 2 included the polycarbonate resin and p-toluene sulfonic acid (PTSA) as the acid stabilizer. Examples 3 and 4 (Ex3, Ex4) included the PTSA and butyl tosylate (BuTos) combined to form the acid stabilizer.

To determine the formation of free —OH groups upon processing, color plaques having a thickness of 2.5 millimeters (mm) were injection molded on a machine dedicated to transparent polycarbonate (Engel-75). Materials were dried at 120° C. for 2-3 hours (hrs) prior to injection molding.

As a reference for standard molding conditions, the following temperature profile was used: Zone 1/Zone 2/Zone 3/Nozzle=280/290/300/295° C. The residence time of the material in the screw was controlled by the cooling time. These processing conditions are indicated herein as T(melt)/residence time (in minutes (')) (e.g., 300° C./6'). Abusive molding may be performed at higher temperatures (as discussed herein), but with the same temperature profile as for the reference condition.

Free —OH levels were determined by derivatization and analysis using phosphorus-31 nuclear magnetic resonance (31P NMR). Color values (L*, a*, b* and YI) were calculated from the absorption spectrum of a 2.5 mm thick color plaque (600×600 mm) between 400 nm and 700 nm. The spectrum was measured on a Macbeth 7000A device in transmission mode and UV excluded. The YI (yellowness index) values herein were calculated according the ASTM D1925 method. The ratio of bound UV absorber was established by using Gas Chromatography (GC).

TABLE 2

Formulations with Sulfonic acid and butyl tosylate.

| Component (wt. %) | CE1 | EX2 | EX3 | EX4 |
|---|---|---|---|---|
| PC1 | 17.45 | 17.45 | 17.45 | |
| PC2 | 81.85 | 81.93 | 81.93 | |
| PC3 | | | | 17.45 |
| PC4 | | | | 81.93 |
| AO2 (Irg1076) | 0.02 | 0.02 | 0.02 | 0.02 |
| PETS | 0.3 | 0.3 | 0.3 | 0.3 |
| UV abs. (UV5411) | 0.27 | 0.27 | 0.27 | 0.27 |
| AO1 (Irg168) | 0.036 | 0.06 | 0.06 | 0.06 |
| acid stabilizer type | none | PTSA | PTSA (+BT) | PTSA (+BT) |
| acid stabilizer level (ppm) | | 1 | 0.7 (+0.4) | 0.7 (+0.4) |
| ratio bound/unbound UV (350° C./15) | 3.8 | 1.8 | 0.2 | 0.1 |
| ΔYI (350° C./15) | 1.57 | 0.4 | 0.5 | 0.3 |
| free —OH (ppm) | | | | |
| 300° C./6' | 61 | 60 | 49 | 57 |
| 350° C./6' | 172 | 70 | 98 | 79 |
| 350° C./15' | 411 | 139 | 236 | 131 |

As shown, the results demonstrate the stabilizing properties of PTSA in abusive molding, as Ex2-Ex4 exhibit smaller ΔYI.

Formulations were also prepared using different types of sulfonic acids as the acid stabilizer. Table 3 presents different sulfonic acids including PTSA (or p-TSA), 4-dodecylbenzenesulfonic acid (4-DBSA), poly p-TSA, p-TSA anhydride (p-TSAA), p-TSA sodium (pTSA-Na), and (+)-camphor-10-sulfonic acid (10-CSA).

TABLE 3

Various sulfonic acids as the acid stabilizer.

| Component (wt. %) | Ex5 | Ex6 | Ex7 | Ex8 | CE9 | CE10 | CE11 |
|---|---|---|---|---|---|---|---|
| PC-1 (PC105) | 29.81 | 29.81 | 29.81 | 29.81 | 29.81 | 29.81 | 29.81 |
| PC-2 (PC175) | 69.51 | 69.51 | 69.51 | 69.51 | 69.61 | 69.51 | 69.51 |
| UV 5411 | 0.2 | 0.2 | 0.2 | 0.2 | 0.2 | 0.2 | 0.2 |
| PETS (F538) | 0.3 | 0.3 | 0.3 | 0.3 | 0.3 | 0.3 | 0.3 |
| AO-1 (Irgafos168) | 0.06 | 0.06 | 0.06 | 0.06 | 0.06 | 0.06 | 0.06 |
| AO-2 (Irganox 1076) | 0.02 | 0.02 | 0.02 | 0.02 | 0.02 | 0.02 | 0.02 |

TABLE 3-continued

Various sulfonic acids as the acid stabilizer.

| Component (wt. %) | Ex5 | Ex6 | Ex7 | Ex8 | CE9 | CE10 | CE11 |
|---|---|---|---|---|---|---|---|
| p-TSA premix | 0.1 | | | | | | |
| Poly p-TSA premix | | 0.1 | | | | | |
| p-TSAA premix | | | 0.1 | | | | |
| 4-DBSA premix | | | | 0.1 | | | |
| p-TSA Na premix | | | | | | 0.1 | |
| 10-CSA premix | | | | | | | 0.1 |
| Total | 100 | 100 | 100 | 100 | 100 | 100 | 100 |
| Properties ΔYI after molding (D1925) | | | | | | | |
| 350° C. | 1.57 | 2.22 | 1.65 | 1.67 | 1.96 | 1.71 | 1.80 |
| 350° C./6 min. | 1.74 | 2.45 | 1.72 | 1.67 | 2.50 | 2.99 | 2.17 |
| 350° C./15 min. | 1.96 | 2.85 | 2.11 | 2.05 | 3.65 | 5.03 | 3.11 |

The results of Table 3 demonstrate that among the sulfonic acids R—$SO_3H$, R as an aryl group may exhibit the best stabilizing properties (measured by YI at 350° C. with increasing residence time). Where R is an alkyl group (or at least where R is camphor as in CE10) or the sodium salt do not provide the same color stability. In other words, sulfonic acid salt did not attain the desired properties (CE10). This is indicated by the higher ΔYI values. FIG. 1 presents the ΔYI values for each sample.

Formulations presented in Table 4 include BuTos or PTSA as the acid stabilizer for articles molded under abusive conditions (i.e., higher temperature).

TABLE 4

Formulations and properties at higher molding conditions

| (wt. %) | CE12 | CE13 | CE14 | CE15 | CE16 | Ex17 | Ex18 | Ex19 | Ex20 |
|---|---|---|---|---|---|---|---|---|---|
| PC-1 (PC105) | 29.81 | 29.81 | 29.81 | 29.81 | 29.81 | 29.81 | 29.81 | 29.81 | 29.81 |
| PC-2 (PC175) | 69.61 | 69.585 | 69.56 | 69.51 | 68.61 | 69.585 | 69.56 | 69.51 | 68.61 |
| UV 5411 | 0.2 | 0.2 | 0.2 | 0.2 | 0.2 | 0.2 | 0.2 | 0.2 | 0.2 |
| PETS (F538) | 0.3 | 0.3 | 0.3 | 0.3 | 0.3 | 0.3 | 0.3 | 0.3 | 0.3 |
| AO1 (Irg168) | 0.06 | 0.06 | 0.06 | 0.06 | 0.06 | 0.06 | 0.06 | 0.06 | 0.06 |
| AO2 (Irg1076) | 0.02 | 0.02 | 0.02 | 0.02 | 0.02 | 0.02 | 0.02 | 0.02 | 0.02 |
| BuTos premix-3 | | 0.025 | 0.05 | 0.1 | 1.0 | | | | |
| p-TSA premix | | | | | | 0.025 | 0.05 | 0.1 | 1.0 |
| Total | 100 | 100 | 100 | 100 | 100 | 100 | 100 | 100 | 100 |
| Properties ΔYI after molding (DI925) | | | | | | | | | |
| 370° C. | 3.04 | 2.72 | 2.64 | 2.38 | 1.73 | 2.82 | 2.08 | 1.95 | 1.65 |
| 370° C./6 min. | 8.15 | 7.22 | 6.69 | 5.78 | 3.67 | 6.81 | 4.93 | 4.53 | 2.25 |
| 370° C./15 min. | 17.22 | 14.68 | 13.77 | 11.63 | 11.94 | 12.57 | 10.21 | 9.03 | 8.21 |

Figure 2:
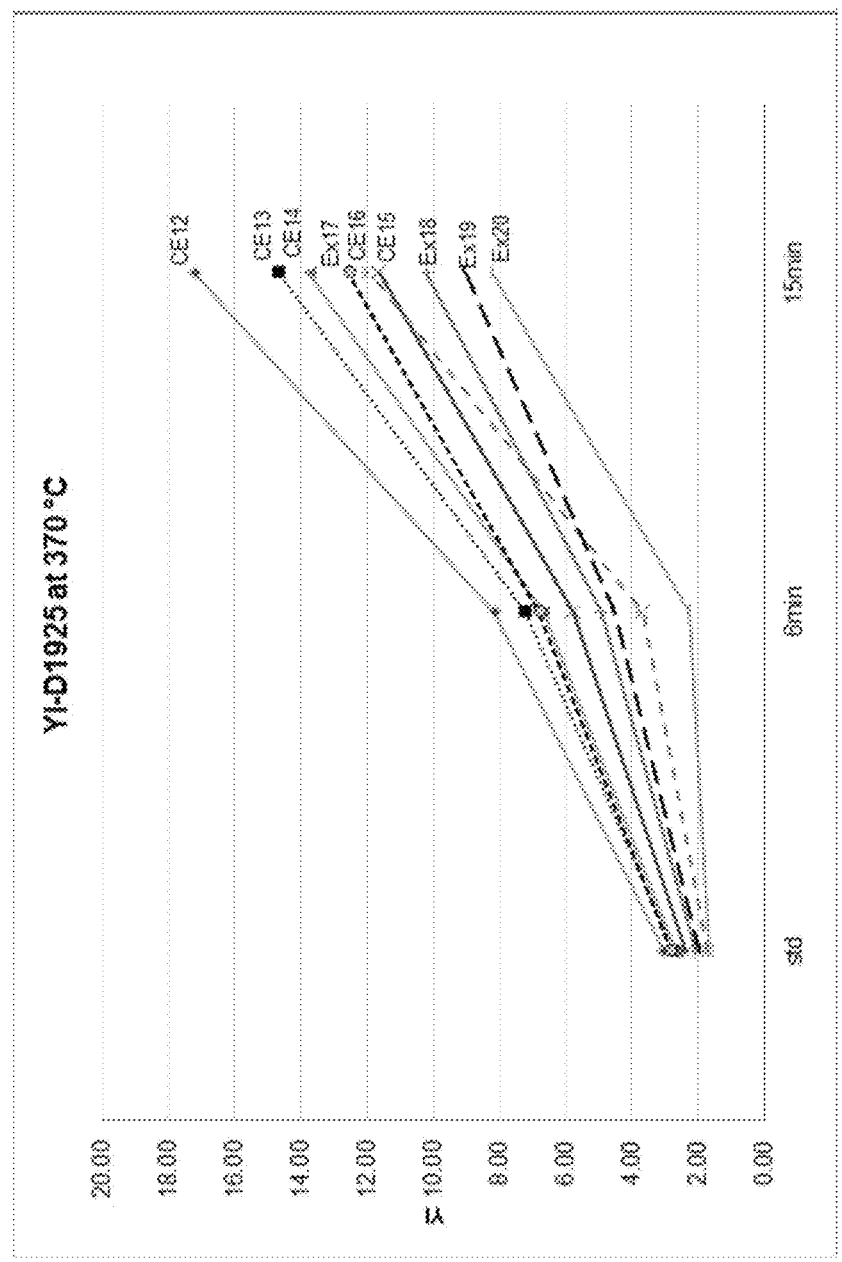
FIG. 2 is a graph showing the change in Yellowness Index for butyl tosylate derivatives after molding conditions of 370° C. compositions.

Table 4 shows that under extreme conditions, polymer compositions comprising PTSA as an acid stabilizer provided even better ΔYI results than a substantially similar composition comprising BuTos as the acid stabilizer. FIG. 2 presents the ΔYI values for each sample.

Formulations presented in Table 5 include the sulfonic acid stabilizer with different polycarbonate resins.

TABLE 5

Abusively molded PPPBP-PC (LEXAN™ XHT) compositions.

| Component (wt. %) | Ex20 | Ex21 | Ex22 | Ex23 | CE24 | CE25 | CE26 |
|---|---|---|---|---|---|---|---|
| PC-1 (PC105) | 7.00 | 7.00 | 7.00 | 7.00 | 7.00 | 7.00 | 7.00 |
| PC-2 (PC175) | 29.00 | 29.00 | 29.00 | 29.00 | 29.00 | 29.00 | 29.00 |
| PC-5 (Standard LEXAN™ XHT) | 63.49 | 63.49 | 63.49 | 63.49 | 63.58 | 63.49 | 63.49 |
| UV 5411 | | | | | | | |
| PETS (F538) | 0.3 | 0.3 | 0.3 | 0.3 | 0.3 | 0.3 | 0.3 |
| AO1 (Irgafos168) | 0.04 | 0.04 | 0.04 | 0.04 | 0.08 | 0.04 | 0.04 |
| AO2 (Irganox 1076) | 0.02 | 0.02 | 0.02 | 0.02 | 0.04 | 0.02 | 0.02 |
| p-TSA premix | 0.15 | | | | | | |
| Poly p-TSA premix | | 0.15 | | | | | |
| p-TSAA premix | | | 0.15 | | | | |

TABLE 5-continued

Abusively molded PPPBP-PC (LEXAN™ XHT) compositions.

| Component (wt. %) | Ex20 | Ex21 | Ex22 | Ex23 | CE24 | CE25 | CE26 |
|---|---|---|---|---|---|---|---|
| 4-DBSA premix | | | | 0.15 | | | |
| p-TSA Na premix | | | | | | 0.15 | |
| 10-CSA premix | | | | | | | 0.15 |
| Total | 100 | 100 | 100 | 100 | 100 | 100 | 100 |
| Properties | | | | | | | |
| ΔYI after molding (DI925) | | | | | | | |
| 355° C. | 3.72 | 4.86 | 3.66 | 3.71 | 7.49 | 6.32 | 4.49 |
| 355° C./5 min. | 10.60 | 10.40 | 10.49 | 9.04 | 23.52 | 23.24 | 17.89 |
| 355° C./10 min. | 20.20 | 21.86 | 19.55 | 18.77 | 37.78 | 36.82 | 29.98 |

Figure 3:
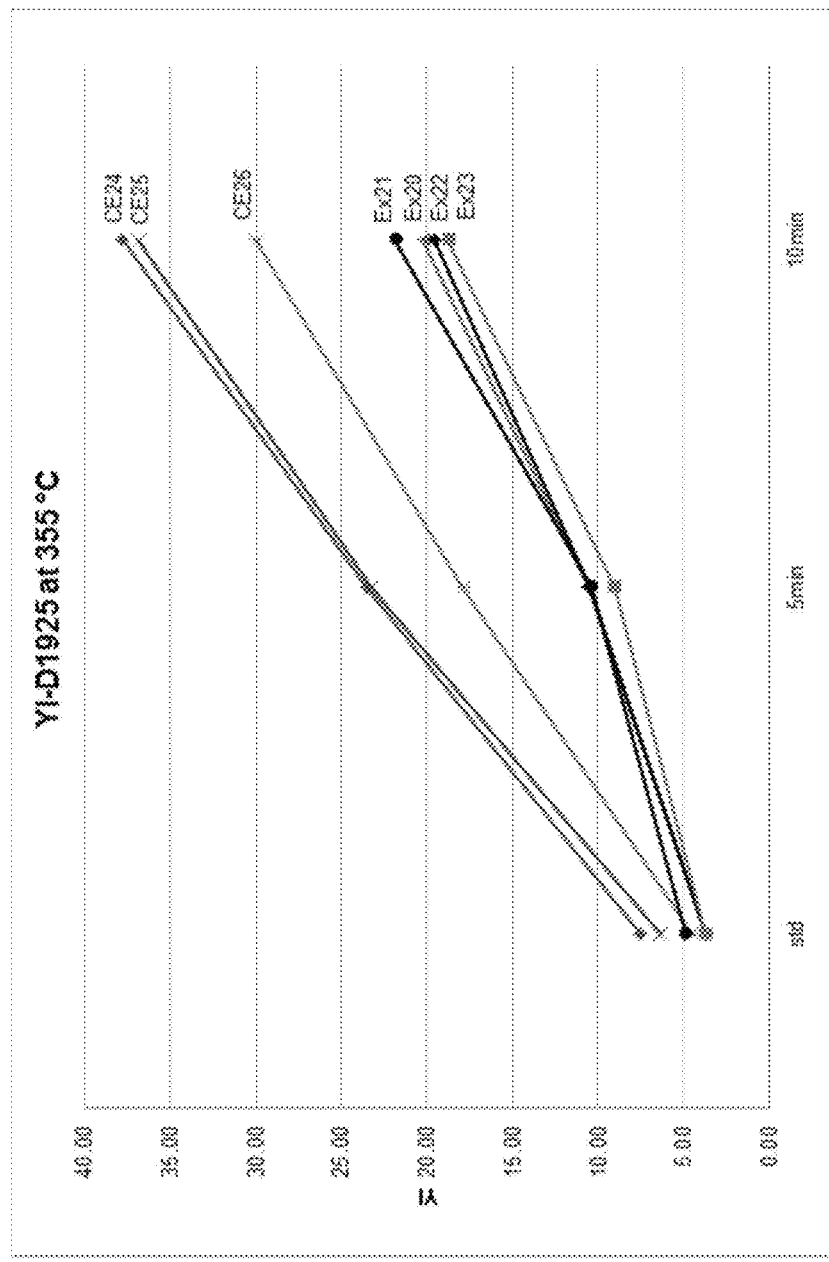
FIG. 3 is a graph showing the change in Yellowness Index for butyl tosylate derivatives after molding conditions of 355° C. for LEXAN™ XHT polycarbonate compositions.

The examples presented in Table 5 demonstrate the effect of sulfonic acids in other polycarbonates such as LEXAN™ XHT (PPPBP-PC). The screened sulfonic acid precursors all fall under the nomenclature of sulfonic acid ester (R—SO$_3$—R$_2$), except the example of a di(methylphenyl) sulfone (R—SO$_2$—O—S¬¬O¬$_2$—R)¬. FIG. 3 presents the ΔYI values for each sample. As is clear from CE25, a metal salt of sulfonic acid does not work.

Exemplary Aspects

In various aspects, the present disclosure pertains to and includes at least the following aspects. The following aspects are illustrative only, and do not serve to limit the scope of the present disclosure Aspect 1. A composition, comprising: a polycarbonate resin formed via an interfacial polymerization process; and from 0.5 ppm to 50 ppm of a sulfonic acid; preferably all of the polycarbonate resin in the composition was formed via an interfacial polymerization process.

Aspect 2. The composition of aspect 1, wherein the polycarbonate resin comprises a polycarbonate homopolymer, a polycarbonate copolymer substantially free of nitrogen, or both.

Aspect 3. The composition of aspect 2, wherein the polycarbonate resin comprises a polycarbonate homopolymer.

Aspect 4. The composition of any of the preceding aspects, wherein the polycarbonate resin is free of or substantially free of a copolymer polycarbonate.

Aspect 5. The composition of any of the preceding aspects, wherein the polycarbonate resin is free or substantially free of a polycarbonate resin formed via a melt polycarbonate process.

Aspect 6. The composition of any of the preceding aspects, wherein the polycarbonate resin has a phenolic endgroup concentration of 150 ppm or fewer.

Aspect 7. The composition of any of the preceding aspects 6, wherein the polycarbonate resin comprises a polycarbonate having a molecular weight of from 5,000 Daltons to 55,000 Daltons.

Aspect 8. The composition of any of the preceding aspects, wherein the polycarbonate resin comprises two or more different high molecular weight polycarbonates.

Aspect 9. The composition of any of the preceding aspects, wherein the polycarbonate resin is present in the composition in an amount from 20 wt % to 85 wt %.

Aspect 10. The composition of any of the preceding aspects, wherein the polycarbonate resin comprises less than 25 parts per million (ppm) of hydroxyl phenolic end groups, preferably less than 20 ppm of hydroxyl phenolic end groups.

Aspect 11. The composition of any of the preceding aspects, wherein the polycarbonate resin comprises less than 100 ppm of benzylic protons.

Aspect 12. The composition of any of the preceding aspects, wherein the polycarbonate resin comprises less than 50 ppm each of sodium, potassium, calcium, or magnesium.

Aspect 13. The composition of any of the preceding aspects, wherein the polycarbonate resin comprises less than 10 ppm of carbamate end groups.

Aspect 14. The composition of any of the preceding aspects, wherein the polycarbonate resin comprises less than 100 ppm of bromine or chlorine.

Aspect 15. The composition of any of the preceding aspects, wherein the polycarbonate resin is endcapped with a carbonate group derived from para-cumyl phenol, para-t-butyl phenol, phenol or a combination comprising at least one of the foregoing.

Aspect 16. The composition of any of the preceding aspects, wherein the polycarbonate resin comprises a mole ratio of carbonate groups of greater than 80%.

Aspect 17. The composition of any of the preceding aspects, wherein the polycarbonate resin exhibits a glass transition temperature (Tg) of between 140-180° C., measured as per ASTM method D3418.

Aspect 18. The composition of any of the preceding aspects, wherein the polycarbonate resin has a purity greater than 99.60% or of at least 99.70% as measured by high performance liquid chromatography.

Aspect 19. The composition of any of the preceding aspects, wherein the polycarbonate resin is produced from a bisphenol A polymer having a purity greater than 99.60% or of at least 99.70% as measured by high performance liquid chromatography and comprises contains less than 2 ppm sulfur as measured by a Total Sulfur Analysis based on combustion and coulometric detection.

Aspect 20. The composition of any of the preceding aspects, wherein the sulfonic acid comprises an organosulfonic stabilizer of the formula wherein each R7 is independently a C1-30 alkyl, C6-30 aryl, C7-30 alkylarylene, C7-30 arylalkylene, or a polymer unit derived from a C2-32 ethylenically unsaturated aromatic sulfonic acid or its ester, and R8 is hydrogen.

Aspect 21. The composition of any of the preceding aspects, wherein the sulfonic acid comprises a p-toluene sulfonic acid.

Aspect 22. The composition of any of the preceding aspects, wherein the sulfonic acid comprises an alkylbenzene sulfonic acid, a polystyrene sulfonic acid, a p-toluene sulfonic acid anhydride.

Aspect 23. The composition of any of the preceding aspects, wherein the sulfonic acid is present in an amount from 0.5 ppm to 5 ppm.

Aspect 24. The composition of any of the preceding aspects, wherein the composition comprises less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography.

Aspect 25. The composition of any of the preceding aspects, wherein the composition comprises phenolic endgroups at less than 2 ppm.

Aspect 26. The composition of any of the preceding aspects, wherein the composition comprises halogen at less than 2 ppm.

Aspect 27. The composition of any of the preceding aspects, wherein the composition comprises a colorant.

Aspect 28. The composition of aspect 27, wherein the colorant comprises one or more of Solvent Green 3, Solvent Green 28, Solvent Green 38, Pigment Green 50, Pigment Green 36, Solvent Red 52, Solvent Red 101, Solvent Red 111, Solvent Red 135, Solvent Red 169, Solvent Red 179, Solvent Red 207, Pigment Red 101, Disperse Red 22, Vat Red 41, Solvent Orange 60, Solvent Orange 63, Disperse Orange 47, Solvent Violet 13, Solvent Violet 14, Solvent Violet 36, Solvent Violet 50, Disperse violet 26/31, Pigment Blue 29, Pigment Blue 60, Copper Phthalocyanine Pigment Blue 15.4, Disperse Blue 73, Solvent Blue 97, Solvent Blue 101, Solvent Blue 104, Solvent Blue 122, Solvent Blue 138, Pigment Yellow 53, Pigment Yellow 138, Pigment Yellow 139, Disperse Yellow 201, Solvent Yellow 33, Solvent Yellow 114, Solvent Yellow 93, Solvent Yellow 98, Solvent Yellow 163, Solvent Yellow 160:1, Solvent Yellow 188, Pigment Brown 24, Amino Ketone Black, chrome oxides, carbon black, channel black, and pigment black 6.

Aspect 29. The composition of any of aspects 27-28, wherein the colorant is free of or substantially free of cadmium, mercury, lead, thallium, or arsenic.

Aspect 30. The composition of any of one of the preceding aspects, further comprising a heat stabilizer.

Aspect 31. The composition of aspect 30, wherein the heat stabilizer is present in the composition in an amount of from 0.01 wt % to 1 wt %.

Aspect 32. The composition of any of the preceding aspects, wherein a molded plaque formed from the composition exhibits when tested in accordance with ASTM D1925, exhibits a yellowness index that is less than that of a reference molded plaque injection molded from a substantially similar reference composition consisting essentially of the polycarbonate resin and in the absence of the sulfonic acid.

Aspect 33. The composition of any of the preceding aspects, wherein a molded plaque formed from the composition exhibits when tested in accordance with ASTM D1925, exhibits a yellowness index that is less than 4.

Aspect 34. The composition of any of the preceding aspects, wherein a molded plaque formed from the composition exhibits when tested in accordance with ASTM D1925, exhibits a yellowness index that is less than 2.

Aspect 35. The composition of any of the preceding aspects, wherein a molded plaque formed from the composition exhibits when tested in accordance with ASTM D1925, exhibits a yellowness index that is between 1.5 and 2.

Aspect 36. The use of a composition according to any of the preceding aspects for preparing an injection molded article.

Aspect 37. A method of preparing an injection molded article, comprising: injection molding a composition according to any of the preceding aspects.

Aspect 38. The method of aspect 37, wherein the injection molded article at a thickness of 3.2 mm exhibits a yellowness index that is less than that of a reference molded plaque injection molded from a substantially similar reference composition consisting essentially of the polycarbonate resin and in the absence of the sulfonic acid when measured in accordance with ASTM D1925.

Aspect 39. The method of any of aspects 37-38, wherein the injection molding comprises a flow length in the range of from 100 mm to 300 mm.

Aspect 40. The method of aspect 39, wherein the injection molding comprises a flow length of greater than 100 mm.

Aspect 41. The method of any of aspects 37-40, wherein the injection molding comprise a maximum molding temperature of at least 330° C. at a residence time of at least 10 minutes, or a maximum molding temperature of at least 340° C. at a residence time of at least 6 minutes, or a maximum molding temperature of at least 350° C. at a residence time of at least 6 minutes, or a maximum molding temperature of at least 360° C. at a residence time of at least 3 minutes.

Aspect 42. The method of any of aspects 37-41, wherein at least a portion of the injection molding is performed at or 370° C.

Aspect 43. An injection molded article comprising: a composition according to any of aspects 1-35.

Aspect 44. The injection molded article of aspect 43, wherein the article is selected from the group consisting of a lens, a vehicle light, a waveguide element, a reflector, a collimator, a housing for a light source, a lamp bezel, a lamp holder, a lamp cover, a display screen, glazing, a safety goggle, a visor, a medical device, a face shield, an optical fiber, a fuse, a component of a domestic appliance, a machine housing, a fire shield, a food tray, a packaging film, an animal cage, a tray, an optical film, a light bulb, or a film laminate.

Aspect 45. The injection article of aspect 42, wherein the article is characterized as a lens.

Aspect 46. The injection article of any of aspects 43-45, wherein the article includes a region having a thickness of from 1 mm to 5 mm.

Aspect 47. A method of forming an article, the method comprising: combining (a) a polycarbonate resin formed from an interfacial polymerization process and (b) a sulfonic acid, so as to form a polycarbonate composition; and molding the polycarbonate composition to form the article.

Aspect 48. A composition, comprising: a polycarbonate resin formed from an interfacial polymerization process; and a sulfonic acid; wherein a molded plaque formed from the composition exhibits a yellowness index that is less than that of a reference molded plaque injection molded from a substantially similar reference composition consisting essentially of the polycarbonate resin and in the absence of the sulfonic acid when measured in accordance with ASTM D1925.

Aspect 49. A composition, comprising: a polycarbonate resin formed from an interfacial polymerization process; and a sulfonic acid, wherein a molded plaque formed from the composition exhibits a yellowness index that is less than 4 when measured in accordance with ASTM D1925.

Aspect 50. An injection molded article formed from a composition, the composition comprising: a polycarbonate resin formed from an interfacial polymerization process and a sulfonic acid.

Aspect 51. The injection molded article of aspect 50, wherein the injection molded article is selected from the group consisting of a lens, a vehicle light, a waveguide element, a reflector, a collimator, a housing for a light source, a lamp bezel, a lamp holder, a lamp cover, a display screen, glazing, a safety goggle, a visor, a medical device, a face shield, an optical fiber, a fuse, a component of a domestic appliance, a machine housing, a fire shield, a food tray, a packaging film, an animal cage, a tray, an optical film, a light bulb, or a film laminate.

Aspect 52. The use of a sulfonic acid in a polycarbonate composition for reducing an increase in Yellowness Index when the polycarbonate composition is subjected to molding conditions comprising a maximum molding temperature of at least 330° C. at a residence time of at least 10 minutes, or a maximum molding temperature of at least 340° C. at a residence time of at least 6 minutes, or a maximum molding temperature of at least 350° C. at a residence time of at least 6 minutes, or a maximum molding temperature of at least 360° C. at a residence time of at least 3 minutes.

Aspect 53. The use of a sulfonic acid in a polycarbonate composition for reducing a decrease in transmittance of the polycarbonate composition upon injection molding of the polymer composition.

Aspect 54. A method of forming an article, comprises: injection molding a polycarbonate composition that comprises at least a polycarbonate resin, a sulfonic acid, and a heat stabilizer.

Aspect 55. The method of aspect 54, wherein a molded plaque formed from the polycarbonate composition, when tested in accordance with ASTM D1925, exhibits a yellowness index that is less than that of a reference molded plaque injection molded from a substantially similar reference composition consisting essentially of the polycarbonate resin and in the absence of the sulfonic acid.

Aspect 56. The use of a sulfonic acid as a stabilizer in a polycarbonate composition.

It is also to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims that follow, reference is made to a number of terms that shall be defined herein.

As used in the specification and the appended claims, the singular forms "a," "an" and "the" include plural referents unless the context clearly dictates otherwise. Thus, for example, reference to "a polycarbonate" includes mixtures of two or more polycarbonate polymers.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optional additional additive materials" means that the additional additive materials can or cannot be substituted and that the description includes molded articles that both include and do not include additional additive materials.

As used herein, the term "effective amount" refers to an amount that is sufficient to achieve the desired modification of a physical property of the composition or material. For example, an "effective amount" of a heat stabilizer refers to an amount that is sufficient to achieve the desired improvement in the property modulated by the formulation component, e.g. achieving the desired level of UV absorbing component stability and/or color stability. The specific level in terms of wt % in a composition required as an effective amount will depend upon a variety of factors including the amount and type of polycarbonate, amount and type of other components, and end use of the article made using the composition.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

The terms "BisA," "BPA," or "bisphenol A," which can be used interchangeably, as used herein refers to a compound having a structure represented by the formula:

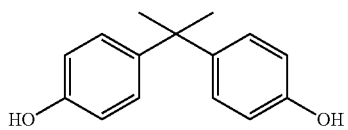 [SMILES: CC(C)(c1ccc(O)cc1)c1ccc(O)cc1]

BisA can also be referred to by the name 4,4'-(propane-2,2-diyl)diphenol; p,p'-isopropylidene bisphenol; or 2,2-bis(4-hydroxyphenyl)propane. BisA has the CAS #80-05-7.

As used herein, "polycarbonate" refers to an oligomer or polymer including residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group can be defined as OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C=C(CD) are intended to include both the E and Z isomers. This can be presumed in structural formulae herein wherein an asymmetric alkene is present, or it can be explicitly indicated by the bond symbol C.

The term "alkynyl group" as used herein is a hydrocarbon group of 2 to 24 carbon atoms and a structural formula containing at least one carbon-carbon triple bond.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulfur, or phosphorus.

The term "aralkyl" as used herein is an aryl group having an alkyl, alkynyl, or alkenyl group as defined above attached to the aromatic group. An example of an aralkyl group is a benzyl group. The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula OC(O)OR, where R can be hydrogen, an alkyl, alkenyl, alkynyl, aryl, aralkyl, cycloalkyl, halogenated alkyl, or heterocycloalkyl group described above. The term "carboxylic acid" as used herein is represented by the formula C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "ether" as used herein is represented by the formula AOA1, where A and A1 can be, independently, an alkyl, halogenated alkyl, alkenyl, alkynyl, aryl, heteroaryl, cycloalkyl, cycloalkenyl, heterocycloalkyl, or heterocycloalkenyl group described above.

As used herein, the term "substantially identical reference composition" refers to a composition that is substantially identical to the inventive composition by consisting essentially of substantially the same proportions and components but in the absence of a single component.

As used herein, free of or substantially free of may refer to less than 10%, or less than 5%, or less than 1%, or 0% for a given component. In further examples, free of or substantially free of may refer to less than 100 ppm, less than 50 ppm, less than 10 ppm, or less than 5 ppm, or 0 ppm for a given component.

Unless otherwise stated to the contrary herein, all test standards are the most recent standard in effect at the time of filing this application (Jun. 16, 2017).

The present application claims priority to US Provisional Application Ser. No. 62/520,962, filed Jun. 16, 2017.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

The above description is intended to be illustrative, and it is not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

That which is claimed is:

1. A method of preparing an injection molded article, comprising:
   injection molding a composition, wherein the composition comprises a polycarbonate resin formed via an interfacial polymerization process; and 0.05 ppm to 50 ppm by weight of a sulfonic acid, based on a total weight of the composition;
   wherein the injection molding comprises
   a maximum molding temperature of at least a last heating zone of a molding machine of at least 330 to less than 340° C. at a residence time of at least 10 minutes, or a maximum molding temperature of at least a last heating zone of a molding machine of at least 340 to less than 350° C. at a residence time of at least 6 minutes, or a maximum molding temperature of at least a last heating zone of a molding machine of at least 350 to less than 360° C. at a residence time of at least 6 minutes, or a maximum molding temperature of at least a last heating zone of a molding machine of at least 360° C. at a residence time of at least 3 minutes—wherein substantially all of the polycarbonate in the composition was formed via an interfacial polymerization process.

2. The method of claim 1, wherein the polycarbonate resin comprises a polycarbonate homopolymer.

3. The method of claim 1, wherein the polycarbonate resin has a purity greater than 99.60% as measured by high performance liquid chromatography.

4. The method of claim 1, wherein the sulfonic acid comprises an organosulfonic stabilizer of the formula

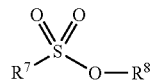

wherein each $R^7$ is independently a $C_{1-30}$ alkyl, $C_{6-30}$ aryl, $C_{7-30}$ alkylarylene, $C_{7-30}$ arylalkylene, or a polymer unit derived from a $C_{2-32}$ ethylenically unsaturated aromatic sulfonic acid or its ester, and $R^8$ is hydrogen.

5. The method of claim 1, wherein the sulfonic acid comprises a p-toluene sulfonic acid.

6. The method of claim 1, wherein the sulfonic acid is present in an amount from 0.5 ppm to 5 ppm by weight, based on a total weight of the composition.

7. The method of claim 1, wherein the composition comprises a colorant.

8. The method of claim 1, wherein a 3.2 mm molded plaque formed from the composition exhibits when tested in accordance with ASTM D1925(1988), exhibits a yellowness index that is less than 4.

9. The method of claim 1, wherein a 3.2 mm molded plaque formed from the composition exhibits when tested in accordance with ASTM D1925(1988), exhibits a yellowness index that is between 1.5 and 2.

10. The method of claim 1, wherein the article is selected from the group consisting of a lens, a vehicle light, a waveguide element, a reflector, a collimator, a housing for a light source, a lamp bezel, a lamp holder, a lamp cover, a display screen, glazing, a safety goggle, a visor, a medical device, a face shield, an optical fiber, a fuse, a component of a domestic appliance, a machine housing, a fire shield, a food tray, a packaging film, an animal cage, a tray, an optical film, a light bulb, or a film laminate.

11. The method of claim 1, wherein the polycarbonate resin has a hydroxyl phenolic endgroup concentration of 150 ppm or fewer.

12. The method of claim 1, wherein the sulfonic acid comprises an alkylbenzene sulfonic acid, a polystyrene sulfonic acid, a p-toluene sulfonic acid anhydride.

13. The method of claim 1, wherein the injection molding comprises a maximum molding temperature of at least 355° C.

14. The method of claim 1, wherein the injection molding comprises a maximum molding temperature of at least 360° C.

15. The method of claim 1, wherein the injection molding comprises a maximum molding temperature of at least 365° C.

16. The method of claim 1, wherein the injection molding comprises a maximum molding temperature of at least 370° C.

17. The method of claim 1, wherein the sulfonic acid comprises a p-toluene sulfonic acid anhydride.

18. A method of preparing an injection molded article, comprising:
   injection molding a composition, wherein the composition comprises a polycarbonate resin formed via an interfacial polymerization process; wherein the polycarbonate resin has a hydroxyl phenolic endgroup concentration of 150 ppm or fewer and comprises 0.05 ppm to 50 ppm by weight of a sulfonic acid, based on a total weight of the composition; wherein the sulfonic acid comprises an alkylbenzene sulfonic acid, a polystyrene sulfonic acid, or a p-toluene sulfonic acid anhydride;

wherein the injection molding comprises a maximum molding temperature of at least a last heating zone of a molding machine of 330 to less than 340° C. at a residence time of at least 10 minutes, or a maximum molding temperature of at least a last heating zone of a molding machine of 340 to less than 350° C. at a residence time of at least 6 minutes, or a maximum molding temperature of at least a last heating zone of a molding machine of 350 to less than 360° C. at a residence time of at least 6 minutes, or a maximum molding temperature of at least a last heating zone of a molding machine of at least 360° C. at a residence time of at least 3 minutes—and wherein substantially all of the polycarbonate in the composition was formed via an interfacial polymerization process.

* * * * *